United States Patent
Gambacorta

(10) Patent No.: US 12,201,491 B2
(45) Date of Patent: *Jan. 21, 2025

(54) SECURE FRICTION RETAINED DENTURE

(71) Applicant: Enzo Gambacorta, Harrison, NY (US)

(72) Inventor: Enzo Gambacorta, Harrison, NY (US)

(*) Notice: Subject to any disclaimer, the term of this patent is extended or adjusted under 35 U.S.C. 154(b) by 344 days.

This patent is subject to a terminal disclaimer.

(21) Appl. No.: 17/723,040

(22) Filed: Apr. 18, 2022

(65) Prior Publication Data

US 2022/0233290 A1    Jul. 28, 2022

Related U.S. Application Data

(63) Continuation-in-part of application No. 16/988,638, filed on Aug. 8, 2020, now Pat. No. 11,684,459.

(60) Provisional application No. 62/884,254, filed on Aug. 8, 2019.

(51) Int. Cl.
*A61C 13/277* (2006.01)
*A61C 13/265* (2006.01)

(52) U.S. Cl.
CPC ........ *A61C 13/277* (2013.01); *A61C 13/2653* (2013.01)

(58) Field of Classification Search
CPC ... A61C 8/0095; A61C 8/0065; A61C 8/0086; A61C 8/0048; A61C 13/273; A61C 13/225; A61C 13/265; A61C 13/2653; A61C 13/2656; A61C 13/267; A61C 13/277; A61C 13/275

See application file for complete search history.

(56) References Cited

U.S. PATENT DOCUMENTS

| | | | | |
|---|---|---|---|---|
| 5,106,299 A | * | 4/1992 | Ghalili | A61C 8/0048 433/172 |
| 10,485,637 B2 | * | 11/2019 | Atkin | A61C 8/0068 |
| 2023/0041062 A1 | * | 2/2023 | Di Edoardo | A61C 13/235 |

FOREIGN PATENT DOCUMENTS

DE          3431890          *    1/1986

* cited by examiner

*Primary Examiner* — Edward Moran
(74) *Attorney, Agent, or Firm* — James A. Italia; Italia IP

(57) ABSTRACT

A feature for retaining a denture on dental implants is shown and described. An anchor for receiving prongs is threaded to each of one or more implants in the mouth. A denture having prong passages is placed onto jaw bone or overlying tissue, above the implant. The anchor occupies an opening in the denture. With the denture in place and with the prong passages aligned with prong reception sites of the anchor, a pronged denture connector is installed such that the prongs pass through the prong passages of the denture and penetrate the prong reception sites of the anchor. The prongs are frictionally secured in place by an elastic member lining the prong passages of the denture and constricting over inserted prongs. Optionally, the elastic members include a bridge securing one elastic member parallel to the other. The denture may comprise synthetic resin reinforced by a metallic reinforcing bar.

17 Claims, 9 Drawing Sheets

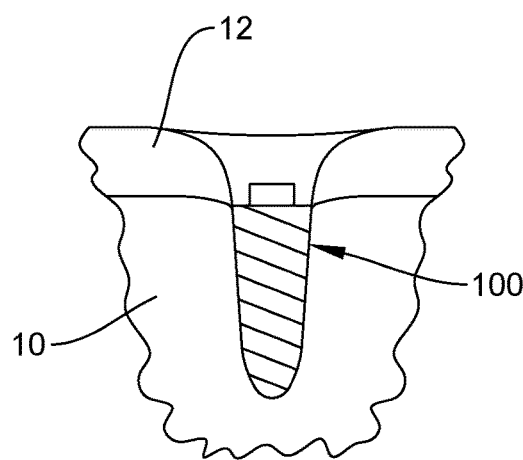
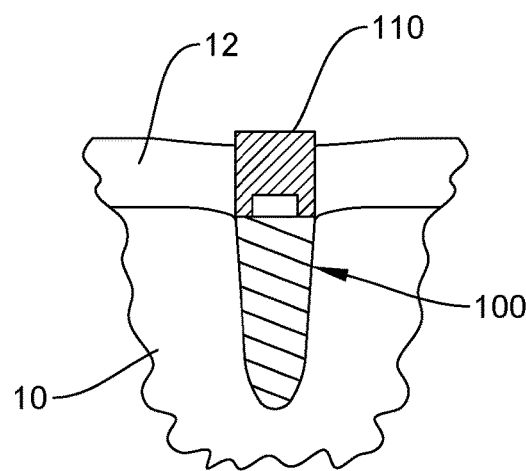
FIG. 1        FIG. 2
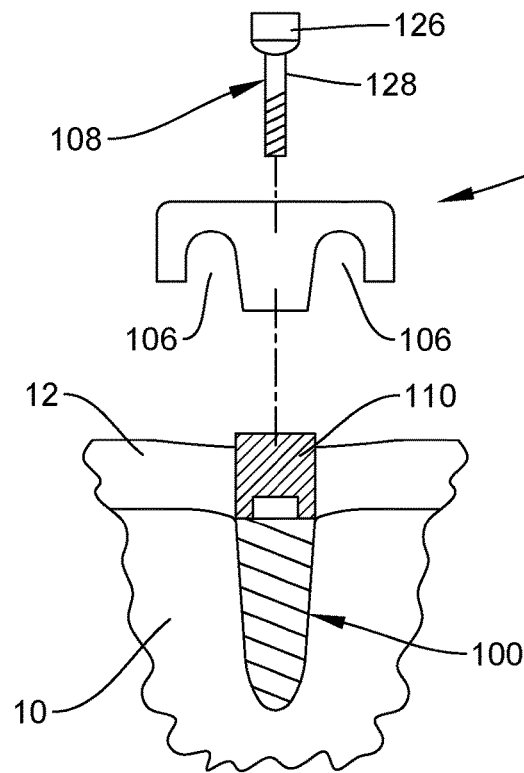
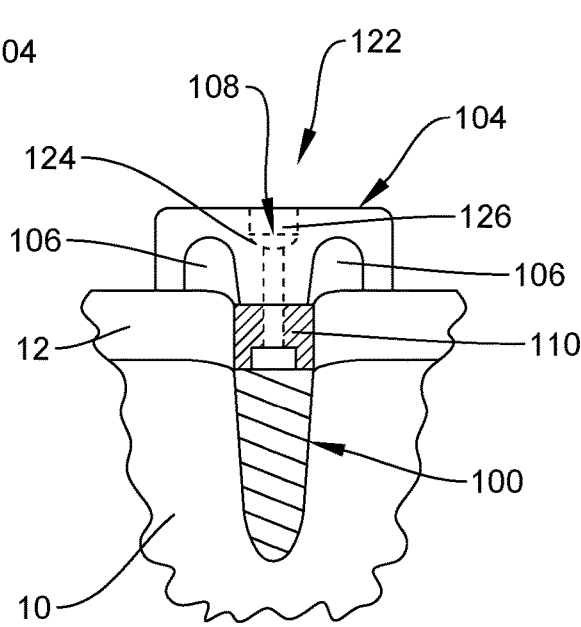
FIG. 3A        FIG. 3B

SECURE FRICTION RETAINED DENTURE

CROSS-REFERENCE TO RELATED APPLICATION

The present application is a continuation-in-part application of U.S. Non-Provisional Utility application Ser. No. 16/988,638 filed Aug. 8, 2020, which claims the benefit of priority to U.S. Provisional Application Ser. No. 62/884,254 filed Aug. 8, 2019; the contents of both are incorporated by this reference.

FIELD OF THE INVENTION

The present invention relates to dentistry, and more particularly, to functionally secure frictionally retained dentures.

BACKGROUND OF THE INVENTION

Dentures are typically utilized within the dental field to replace a plurality of natural teeth using a single assembly. Dentures are typically secured to a patient's jaw by use of previously installed dental implants. A number of difficulties arise with prior art dentures. One is that they may require a relatively great number of implants to be properly supported within the mouth. Another is that it may be objectionable to fasten dentures in place using screws or bolts secured to the denture and threaded directly into the implant. For one thing, the implant may be oriented at an angle unsuitable for passing into or through the denture. Another issue may be that bone tissue at any given desired implant site may be eroded or otherwise unsuitable for securely supporting an implant.

There exists a need for denture attachment to the patient's jaw that requires relatively few implants. Also, there is a need to reduce precision in components and component alignment to assure secure attachment to the jaw.

SUMMARY OF THE INVENTION

The present invention sets forth a construction for manually, expeditiously, and securely mounting a denture on the jaw of a patient, using implants. An anchor for receiving prongs is threaded to each of one or more implants in the mouth. A denture having prong passages is placed onto jaw bone or overlying tissue, above the implant (if the lower jaw is being treated). The anchor penetrates the denture, occupying an opening in the denture. With the denture in place and with the prong passages aligned with prong reception sites of the anchor, a pronged denture connector is installed such that the prongs pass through the prong passages of the denture and penetrate the prong reception sites of the anchor. The prongs are each frictionally secured in place by an elastic member lining the prong passages of the denture and constricting over inserted prongs. The elastic members may include a spanning member holding each parallel to the other. The denture may comprise synthetic resin reinforced by a metallic reinforcing bar.

The denture may include a recess configured to enable a pry tool to bear against the denture connector to remove the latter, for example, when replacing or servicing the denture.

The novel arrangement may be utilized with both partial and full arch dentures, the dentures stably secured using only two implants. Also, as will be further detailed hereinafter, it is not necessary to establish great precision in having the prongs and prong reception sites sized and aligned.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a side cross sectional view of a dental implant;

FIG. 2 shows a component added to FIG. 1;

FIG. 3A is a view of the implant of FIG. 1, with additional components shown exploded above the implant;

FIG. 3B shows the components of FIG. 3 fully assembled;

DETAILED DESCRIPTION

Figure 4:
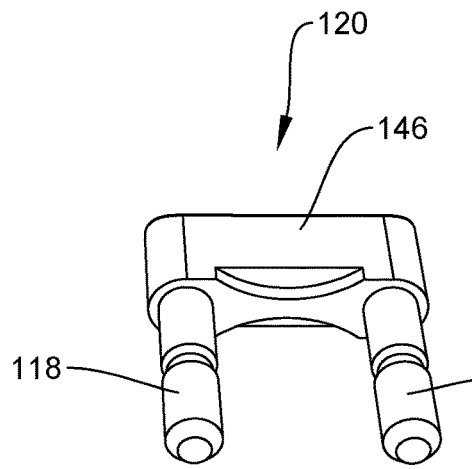
FIG. 4 is a perspective detail view of a component of the novel denture retention system.

Referring first to FIG. 1, there is shown an implant 100 installed in a jaw bone 10 of a patient, with soft tissue such as gum tissue 12 overlying jaw bone 10. Implant 100 may be conventional and may preexist installation of a denture 102 (see FIGS. 6-9), or alternatively, may be fabricated and installed specifically for installation of denture 102. As seen in FIG. 2, a seat 110 for seating elements of a novel denture retention system for denture 102 sits atop implant 100. Seat 110 elevates a load bearing working surface of implant 100 from a location recessed within the jaw to a location reasonably flush with gum tissue 12. It would be possible to omit seat 110 if implant 100 were flush with the upper surface of jaw tissue. Ordinarily, implant 100 sits recessed below such upper surface.

It should be noted at this point that orientational terms such as overlying, atop, laterally, vertically, and transverse refer to the subject drawing as viewed by an observer. The drawing figures depict their subject matter in orientations of normal use, which could obviously change with changes in posture and position of the novel denture retention system as installed in a patient, or with use of an opposed jaw (drawings illustrate a lower jaw). Therefore, orientational terms must be understood to provide semantic basis for purposes of description, and do not limit the invention or its component parts in any particular way.

Referring also to FIGS. 3A-9, there are additionally shown elements of the novel denture retention system for frictionally retaining denture 102 to a jaw of the patient. The denture retention system may comprise at least one prong anchor 104 (shown isolated from other elements in FIG. 3A) having a plurality of prong reception sites 106 and an implant connector (e.g., a screw 108) configured to secure prong anchor 104 to dental implant 100.

The denture retention system may also comprise denture 102 comprising a base 112 (FIGS. 8 and 9), at least one prosthetic tooth 114 (FIG. 8) mounted to base 112, at least one opening 116 (FIG. 7) in base 112, opening 116 dimensioned and configured to receive an exposed portion of prong anchor 104 therein, and a plurality of prong passages in base 112. Each of the prong passages is dimensioned and configured to slidably receive a prong 118 (FIG. 4) therethrough.

The denture retention system also includes a denture connector 120 (FIGS. 4-6) having a plurality of parallel prongs 118 dimensioned and configured to pass through the prong passages of denture 102 and to be received within prong reception sites 106 (FIGS. 3A, 3B) of prong anchor 104.

Prong reception sites 106 of prong anchor 104 and the prong passages of base 112 of denture 102 are oriented to enable parallel prongs 118 of denture connector 120 to pass through denture 102 and be received laterally within the at least one prong anchor 104 when prong anchor 104 is coupled to dental implant 100 and dental implant 100 is vertically oriented. Given potential play of prongs 118 with respect to prong passages in denture 102, provision of two prongs 118 stabilizes coupling of denture 102 to prong anchor 104 and hence to the jaw.

Base 112 of denture 102 both establishes a structural member for engaging prong anchor 104 and denture connector 120, and also is preferably configured to provide realistic visual transition from the jaw to gum tissue surrounding prosthetic teeth 114.

Figure 9A:
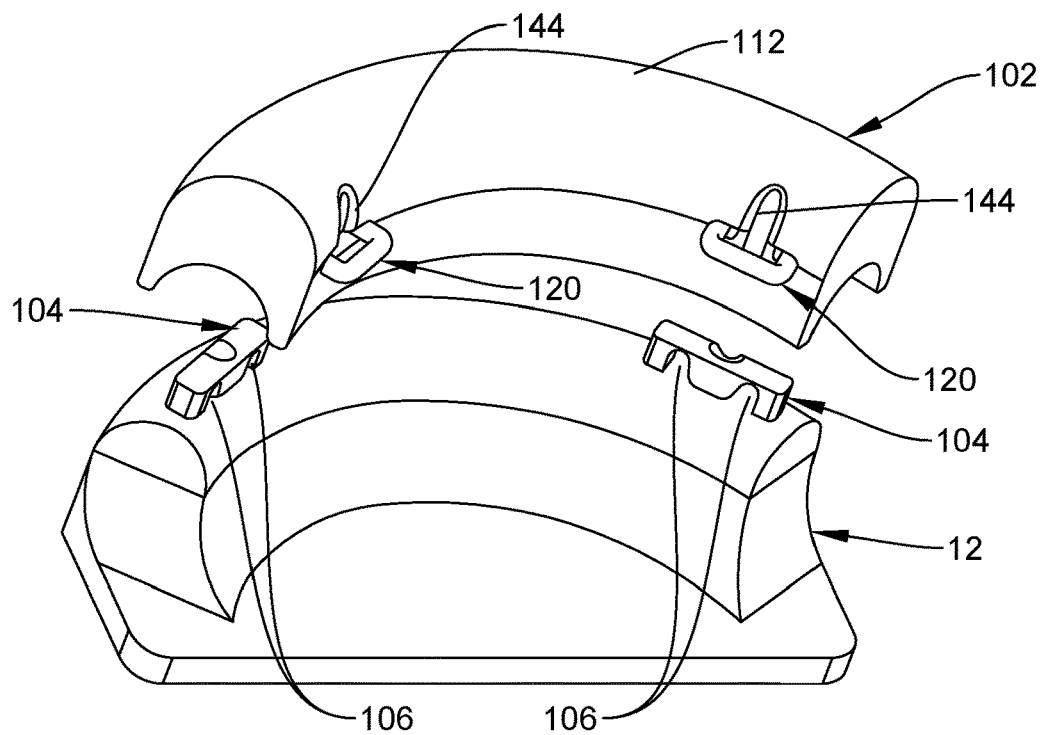
FIG. 9A is a rear exploded perspective view of the assembly of FIG. 8.
Figure 9B:
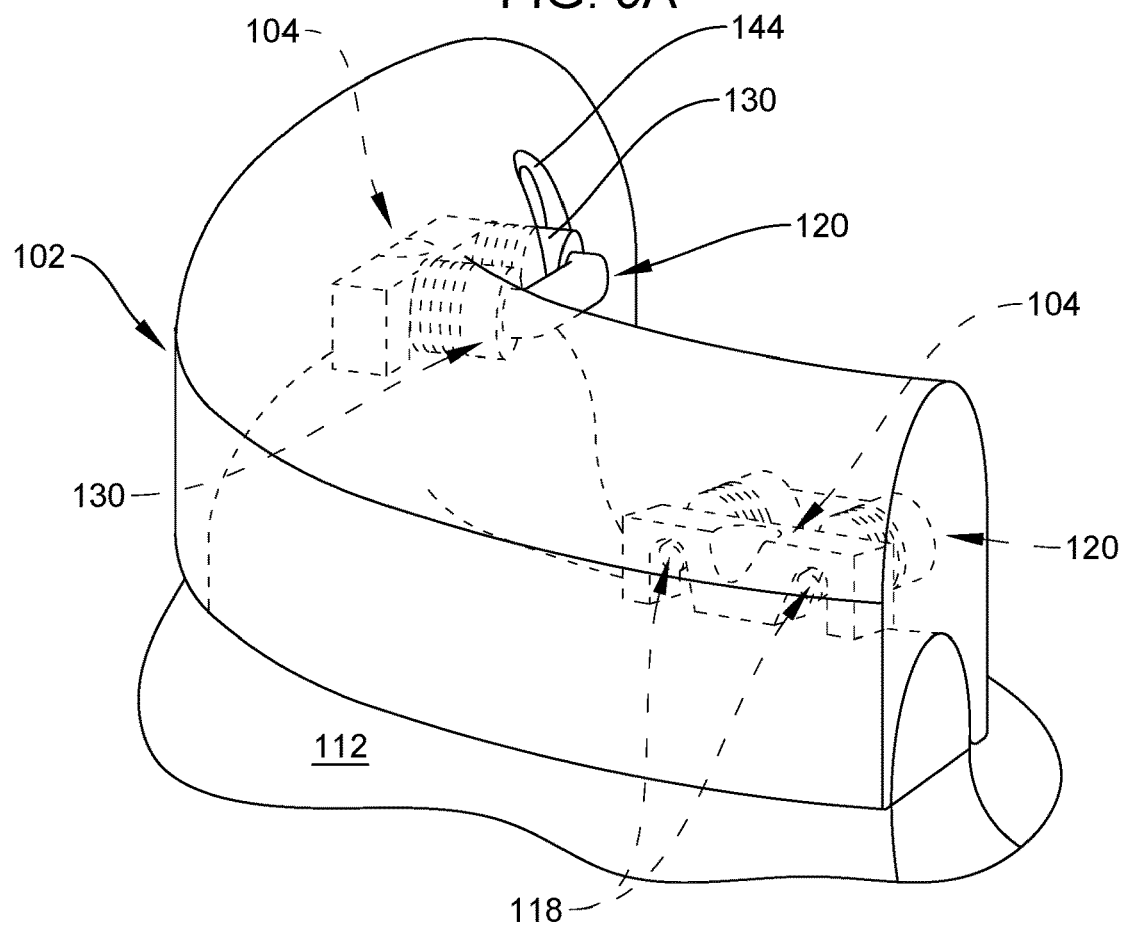
FIG. 9B is a frontal perspective view showing the assembly of FIG. 9A now fully assembled.

FIG. 9A shows denture 102 about to be lowered onto gum tissue, so that prongs 118 of denture connector 120 will enter prong reception sites 106. It will be appreciated that prong reception sites guide prongs 118 into place, but need not receive prongs 118 with great precision or with very close fit. Desired precision is provided by elastomeric barrels 130, to be described hereinafter. FIG. 9B, a frontal view, shows denture 102 fully seated onto physiological features of the jaw of the patient, with denture connector 120 fully inserted.

In summary, denture 102 is held in place by interference fit of prongs 118 with prong reception sites 106, in that denture 102 cannot be elevated from its seated or installed position (as shown e.g. in FIG. 9B).

Figure 7:
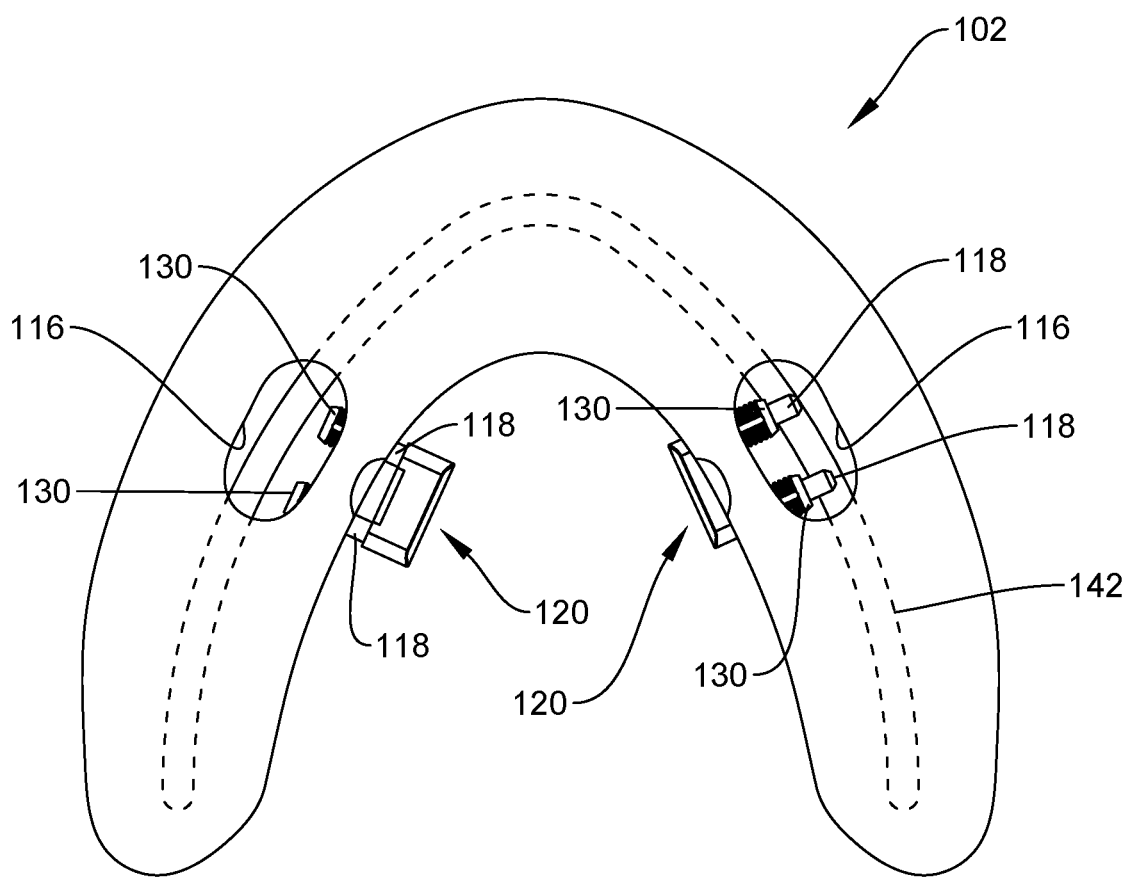
FIG. 7 is a bottom plan view of the denture omitted from FIG. 6.

Also seen in FIG. 7, the denture retention system may further comprise a metallic reinforcement bar 142 in base 112 of the denture, to distribute loads imposed for example by chewing when denture 102 is installed in the patient.

FIG. 7 depicts denture 102 in an exemplary final form; that is, with barrels 130 fixed thereto, for example, by resinous cement, and with prongs 118 of denture connector entrapped by barrels 130, as will be described hereinafter.

Prong anchor 104 may include two prong reception sites 106, with one prong reception site 106 on each side of the implant connector (e.g., screw 108). This arrangement symmetrically and stably distributes forces from clamping denture 102 to prong anchor 104 by using dual prong denture connector 120.

Prong anchor 104 may comprise a bore 122 (FIG. 3B) in prong anchor 104 and a shoulder 124 in bore 122. Shoulder 124 is dimensioned and configured to entrap a head 126 (FIG. 3A) of a threaded fastener (e.g., screw 108) when a shaft 128 (FIG. 3A) of the threaded fastener is passed through bore 122.

Prong anchor 104 may further comprise the threaded fastener (i.e., screw 108) having threaded shaft 128 matingly compatible with female threads (not shown, but conventional in dental implants) of dental implant 100 and head 126 greater in a transverse dimension than threaded shaft 128.

Bore 122 and its associated threaded fastener secure prong anchor 104 to implant 100.

Figure 6:
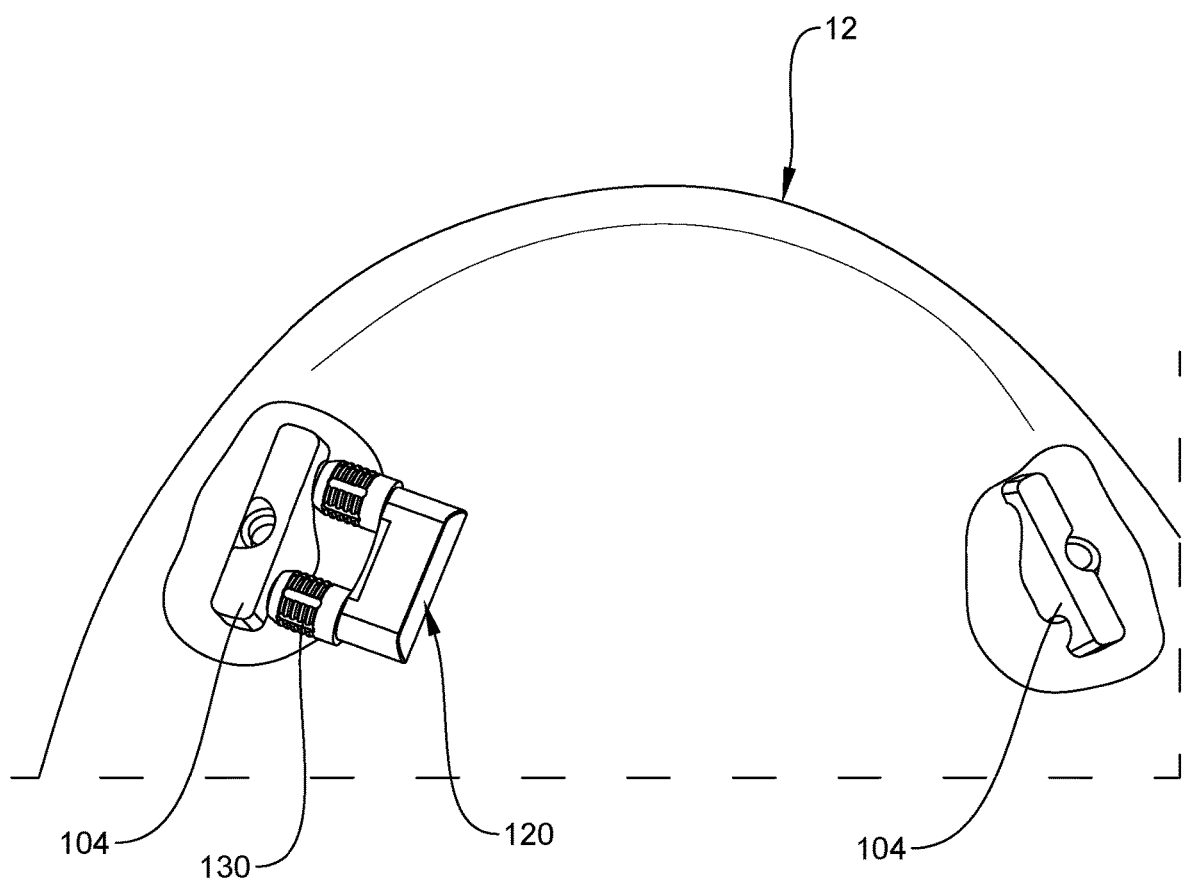
FIG. 6 is an environmental view of a patient's jaw, showing relative positions of components of FIGS. 3A, 3B, 4, and 5 as they would be installed, with a denture which is included in the novel denture retention system omitted for clarity in showing the depicted components.
Figure 8:
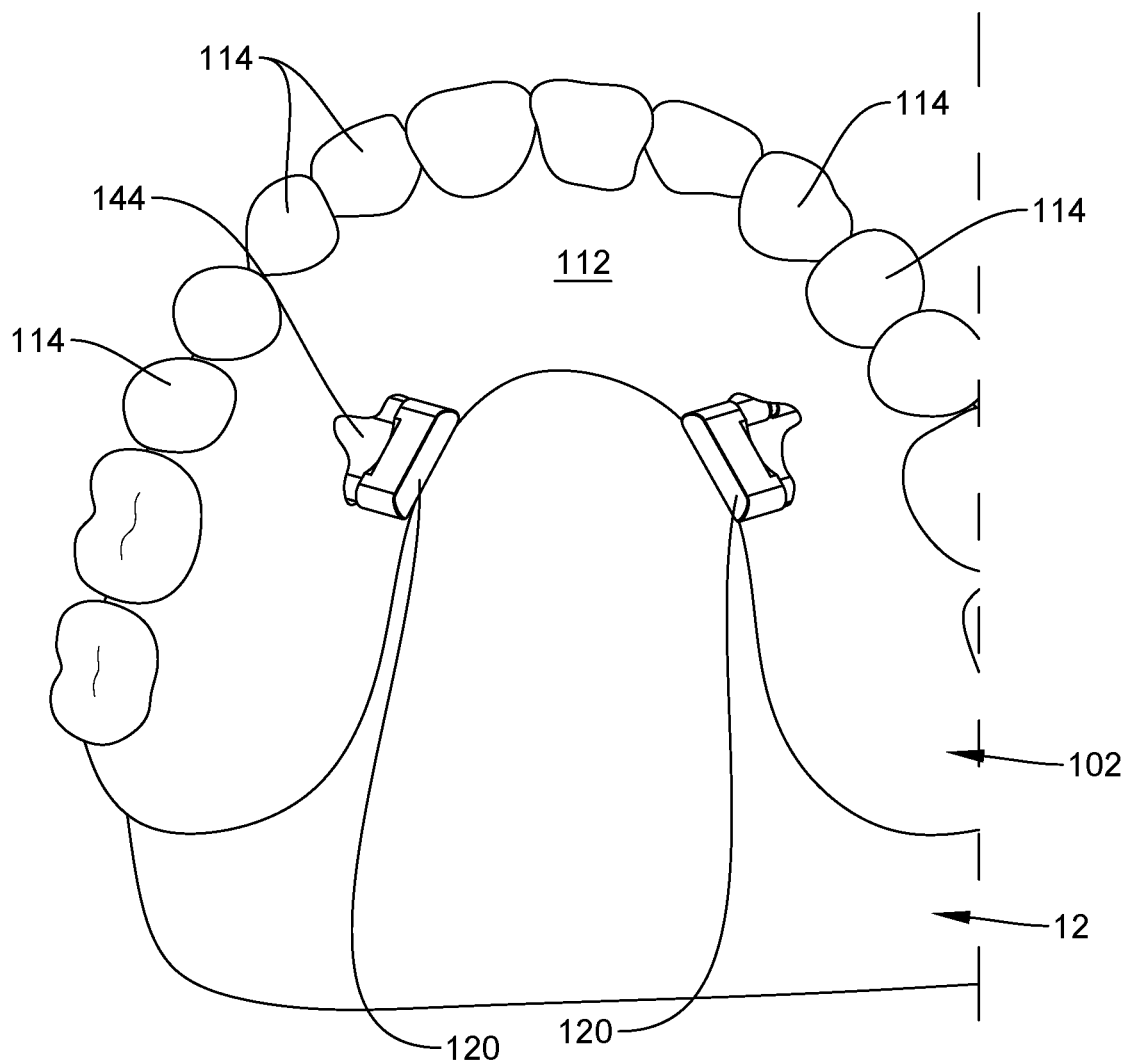
FIG. 8 is an environmental view of FIG. 6, showing the denture of FIG. 7 in a stage of installation to the patient's jaw of FIG. 6.
Figure 10:
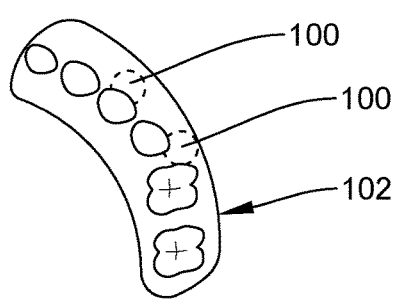
FIG. 10 is a detail view showing a variation on the denture shown in FIG. 8.

As seen in FIG. 8, denture 102 may be a full arch denture 102 spanning at least two dental implants 100 (as seen in FIGS. 6 and 9). However, as seen in FIG. 10, denture 102 may be fabricated as a partial arch denture 102 spanning at least two dental implants 100. Therefore, the novel denture retention system can be used when replacing all teeth of a dental arch, and also when replacing only some of the teeth of a dental arch.

Figure 11:
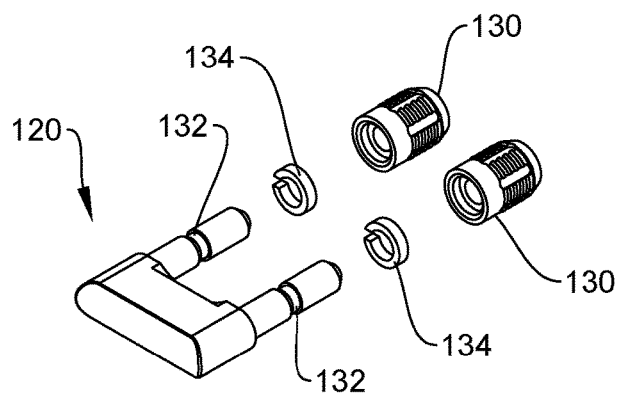
FIG. 11 is an exploded perspective detail view of components shown in FIG. 5.
Figure 12:
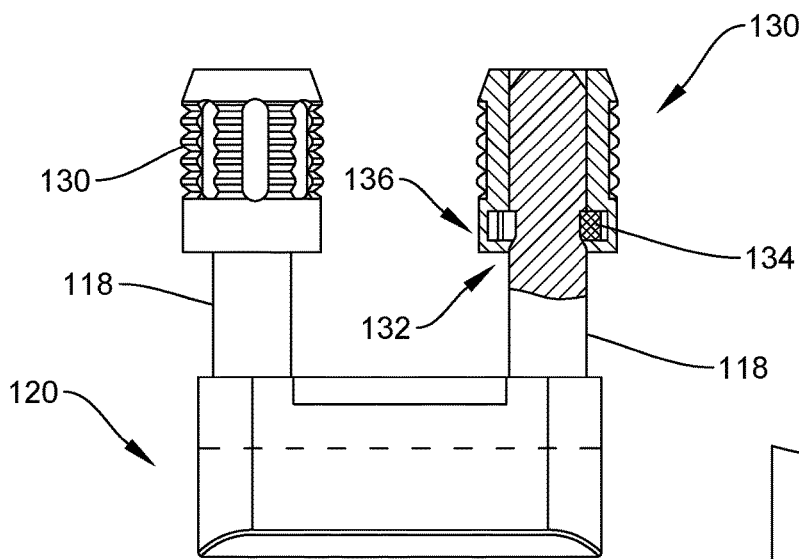
FIG. 12 is a side detail view of the components of FIG. 5, shown partially in cross section.

Referring principally to FIGS. 11 and 12, each prong passage is capable of slidably receiving barrels 130 of denture 120 and are generally made of an expandable elastomeric material that acts to frictionally and releasably engage a respective prong 118 of denture connector 120 when denture connector 120 is installed through denture 102. Alternatively, the barrel 130 may be made of a metallic material and include an inner radially mounted elastomeric ring to provide the desired friction fit. Alternatively still, the barrel may be metallic and at least one of the prongs 118 of the denture connector 120 may include radially mounted elastomeric ring to provide the desired releasable frictional fit relationship between the barrel 130 and prong 118.

The denture retention and release mechanism hereto described also includes two alternative connector retention mechanisms for preventing unintended disengagement of denture connector 120 from the denture 102 when the denture is released from the mouth.

Figure 13:
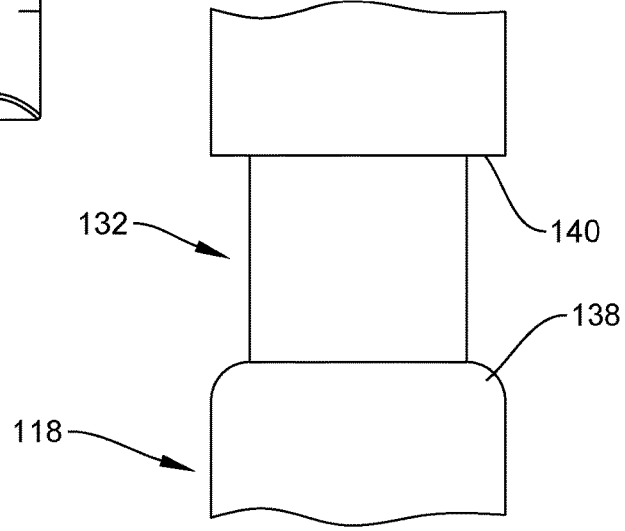
FIG. 13 is an enlarged detail view of a washer retaining groove in prongs shown in FIGS. 11 and 12.

The first embodiment of the connector retention mechanisms is shown in FIGS. 11-13 and the second embodiment is shown in FIGS. 14-20. In the first embodiment, each one of prongs 118 may have a circumferential groove 132 for receiving an internal surface of an expansible washer 134 to retain a respective prong 118 within barrel 130. Each one of barrels 130 has an internal groove 136 (FIG. 12) for receiving an outer surface of expansible washer 134. Circumferential groove 132 may have one tapered end wall 138 (FIG. 13) to facilitate expansion of washer 134 when denture connector 120 is inserted into the denture retention system, and an opposed square cut end wall 140 to oppose excessive withdrawal of denture connector 120. Noting that washer 134 sits in circumferential groove 132 and is expanded first when encountering a blunt end of a prong 118 and remains expanded as it rides along the surface of the prong 118 as the denture is fully secured in place. To remove the denture, prong 118 is moved in the opposite direction until washer 134 contracts and again sits in circumferential groove 132 of prong 118. At this position, further movement of prong 118 in this opposite direction is prevented as it results in the washer 134 encountering non-tapered square cut end wall 140 of the prong 118. This encounter will not expand washer 134, and excessive withdrawal of prongs 118 is prevented.

The purpose of circumferential grooves 132 is to retain denture connector 120 on denture 102. When a prong 118 is first inserted through a corresponding barrel 130 to seat the denture, washer 134 is expanded by contact with the blunt end of each prong 118, constricts as it passes over circumferential groove 132. As prong 118 is pushed further through barrel 130 to enable prong 118 to penetrate prong reception site 106, tapered end wall 138 facilitates expansion of washer 134, the latter spreading or opening to accommodate passage of prong 118 to the fully installed position.

However, should a person attempt to withdraw prong 118, travel of prong 118 is stopped as square cut end wall 140 encounters washer 134. Because of the lack of taper, washer 134 is not urged to open or spread, and further withdrawal of prong 118 is opposed by interference with washer 134, the latter entrapped by corresponding groove 136 of barrel 130. Thus denture connector 120 is prevented from inadvertent loss, while still enabling sufficient withdrawal to manually remove denture 102 from the mouth.

The radial elastic member (e.g., barrels 130) frictionally retains prongs 118 in place. Prongs 118 interengage prong reception sites 106 to retain denture 102 against the jaw by interference fit.

Denture 102 may further comprise a recess 144 configured to provide access for a pry tool (not shown) to dislodge denture connector 120 from an installed position in the denture retention system.

Figure 14:
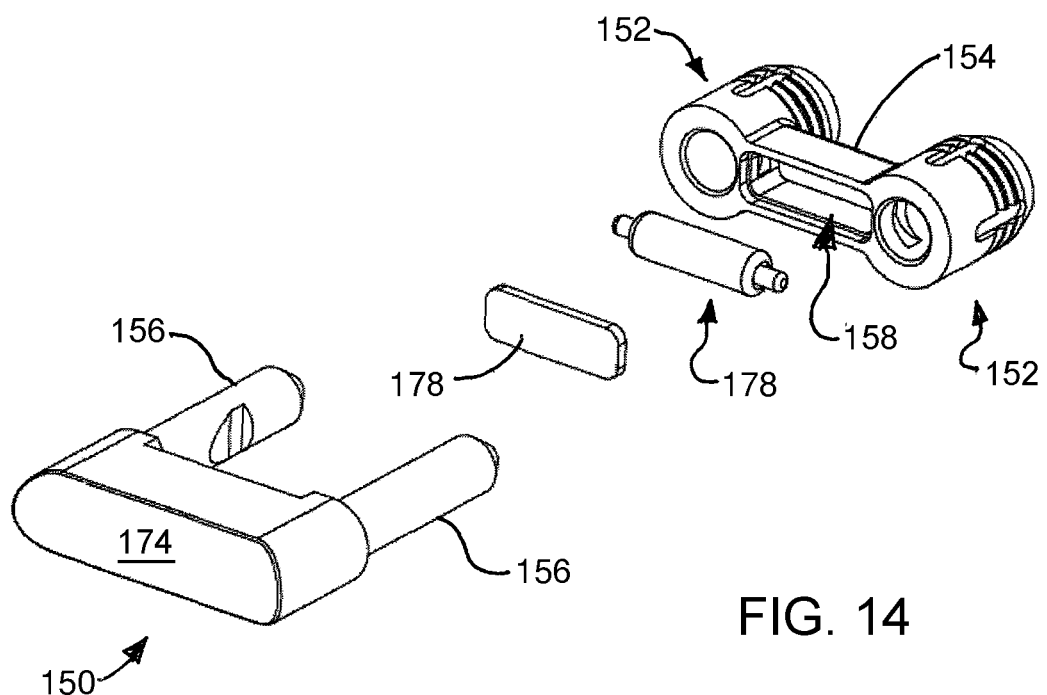
FIG. 14 is an exploded perspective view of an alternative embodiment of a component shown in FIG. 5.
Figure 15:
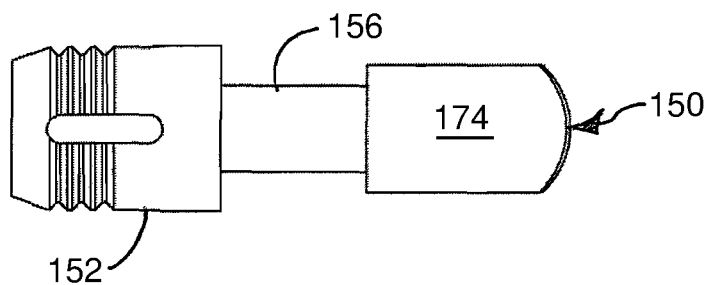
FIG. 15 is a side detail view of the embodiment of FIG. 14, shown assembled.

Turning now to the second embodiment of the connector retention mechanism shown in FIGS. 14-20. FIG. 14, there is shown an alternative embodiment wherein a denture connector 150 is modified from the embodiment of denture connector 120. In the novel denture retention system, each radially elastic member may comprise a barrel 152 slotted to accommodate radial expansion, and a bridge 154 connecting one of barrels 152 to another one of barrels 152. Bridge 154 maintains barrels 152 parallel, with accommodation of minor squirming due to elasticity of barrels 152. This feature facilitates simultaneous insertion of prongs 156 into reception sites 106 (FIG. 9A) despite minor squirming or deforming of barrels 152. Preferably, barrels may be of synthetic resin, polymer, or elastomeric material with sufficient elasticity to accommodate temporary deformation during insertion of prongs 156 and provide for friction fit of said prongs 156. Alternatively, barrels 152 may be of metallic constituency and an elastomeric ring or rings could be placed on the prongs to provide the friction fit.

A chamber 158 may be formed in bridge 154, an expansible pin 160 may be dimensioned and configured to be received in chamber 158. Chamber 158 has opposed openings 162 enabling expansible pin 160 to protrude beyond bridge 154 and bear against prongs 156. Although openings 162 are visible in FIG. 14, their nature is better understood by examination of FIGS. 16 and 17. Expansible pin 160 may comprise two telescoping sections 164 and 166 (FIG. 16) and a spring 168 configured to bias two telescoping sections 164 and 166 to expand.

Figure 16:
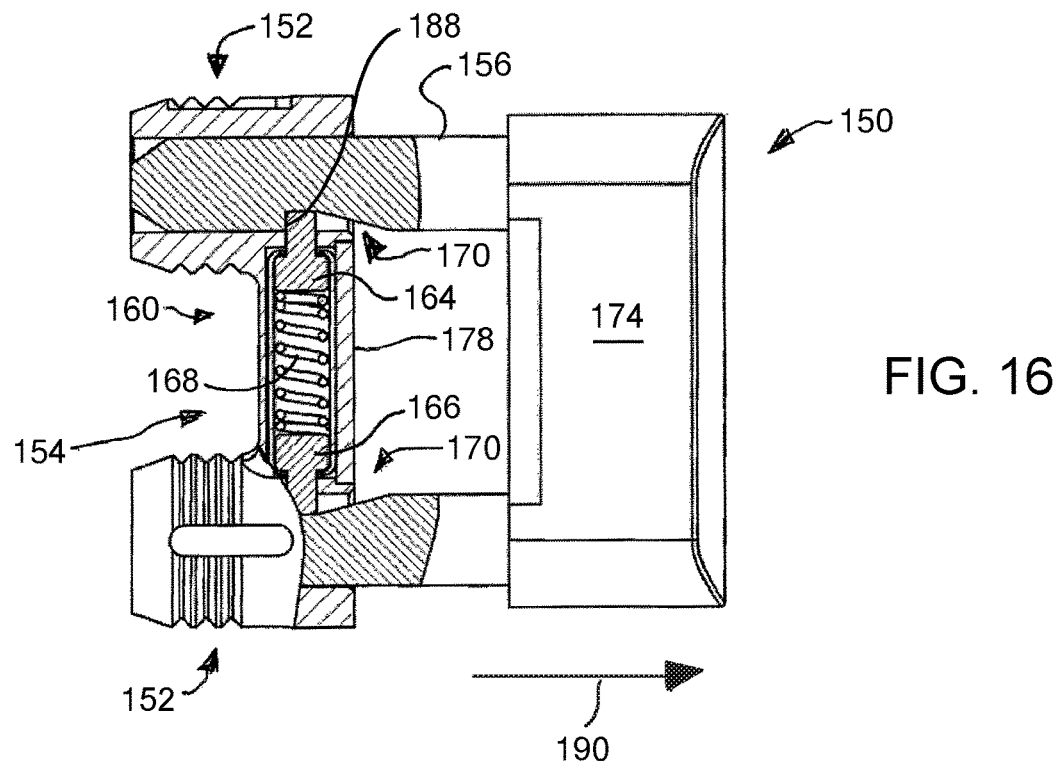
FIG. 16 is a side detail view of FIG. 15, shown partially in cross section.
Figure 17:
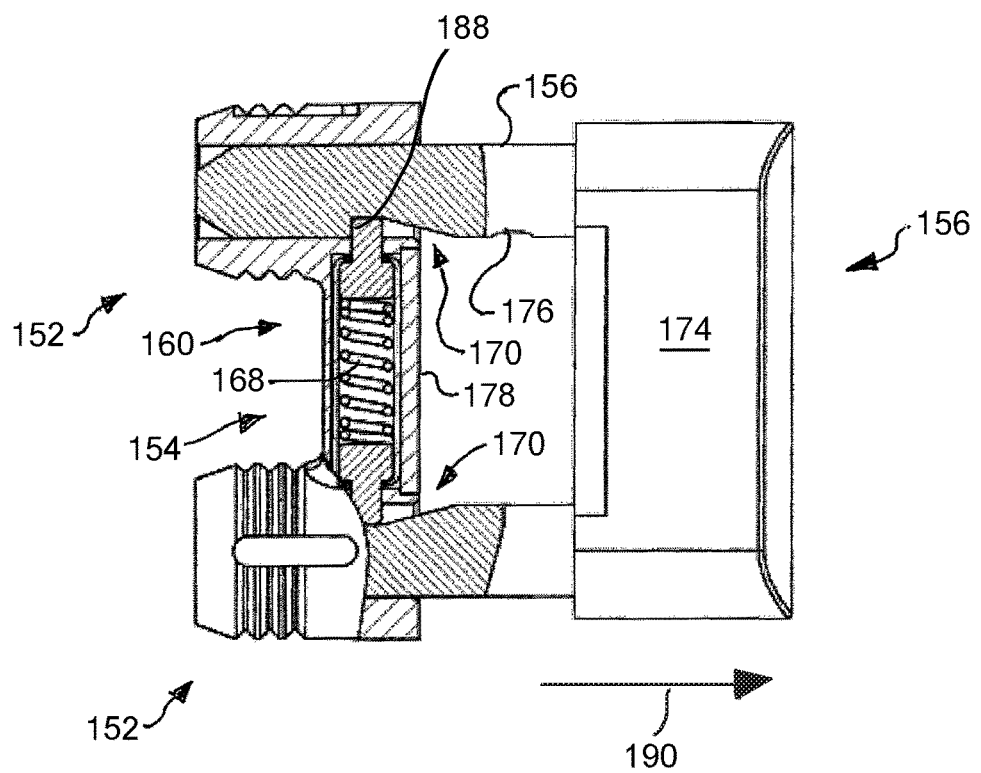
FIG. 17 is a side detail view of FIG. 16, shown partially in cross section, and showing a further alternative embodiment.

The alternative embodiment of the connector retention mechanism has the same and critical function of preventing inadvertent loss of denture connector 150 when denture 102 is being removed from the mouth, and also, of preventing disengagement of denture connector 150 from barrels 152 as denture connector 150 is withdrawn to remove denture 102. Escape of denture connector 150, should that occur, could result in destruction (for example, if dropped onto a floor and stepped on) or loss (for example, swallowed). To this end, and as seen in FIGS. 16 and 17, the connector 150 is shown in the denture release position such that the denture 102 can be removed from the patient's mouth. In this released position it can be seen that the ends of sections 164 and 166 of expansible pin 160 are received in depression 170, and more particularly, in abutment with a shoulder 188 of prong 156. Should denture connector 150 be grasped by head 174 and pulled in a direction of removal (seen as arrow 190), interference of section 164 of expansible pin 160 with shoulder 188 will oppose further withdrawal of denture connector 150 from barrel 156 and hence from denture 102, thereby retaining the connector in the denture 152 when the denture is released and readying it for reinsertion at a later time. Now also referring to FIG. 16, the denture retention system may further comprise a depression 170 on at least one of prongs 156. Depression 170 faces expansible pin 160 when prongs 156 are inserted into barrels 152, Depressions 170 are configured to limit expansion of expansible pin 160, and to include an inclined ramp 172 enabling expansible pin 160 to be compressed as prongs 156 of denture connector 150 advance into respective barrels 152. Thus, a head 174 of denture connector 150 can contact barrels 152 and prongs 156 thereby be fully inserted thereinto.

The denture retention system may further comprise a recess 176 in at least one of prongs 156, recess 176 facing expansible pin 160 when denture connector 150 is fully inserted into barrels 152 thereby securing the denture in place. In the recess 176, the expansible pin is able to expand in the recess 176 as a means of maintaining the position of the denture connector 150 in place. Note that recess 176 is optional and that the denture connector 150 is generally held in position based on the friction of the barrels upon prongs 156.

Figure 5:
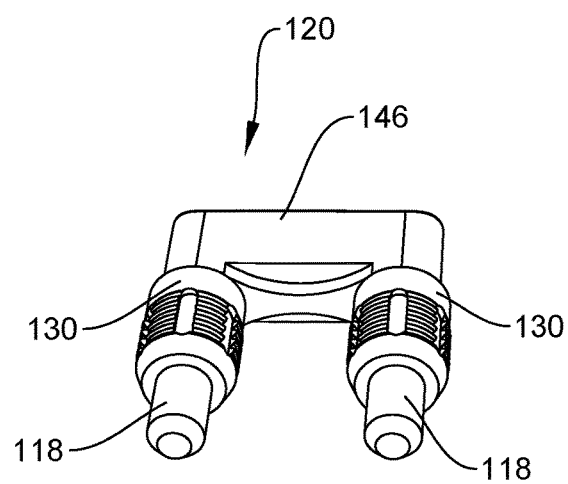
FIG. 5 is similar to FIG. 4, but shows two additional components.

Referring momentarily to FIGS. 5 and 6, denture connector 120 is shown fully inserted into prong anchor 104. This is the fully installed condition of denture 102. In the second embodiment, despite the presence of bridge 154, the fully installed condition of denture 102 would appear much the same. This is reflected in FIG. 20. It will be seen at the right of FIG. 18 that prongs 156 project beyond barrels 152. The exposed portions of prongs 156 have entered reception sites 106 of prong anchor 104 (as seen in FIGS. 3A, 3B, and 6) to lock denture 102 to prong anchors 104 (FIG. 6).

Figure 18:
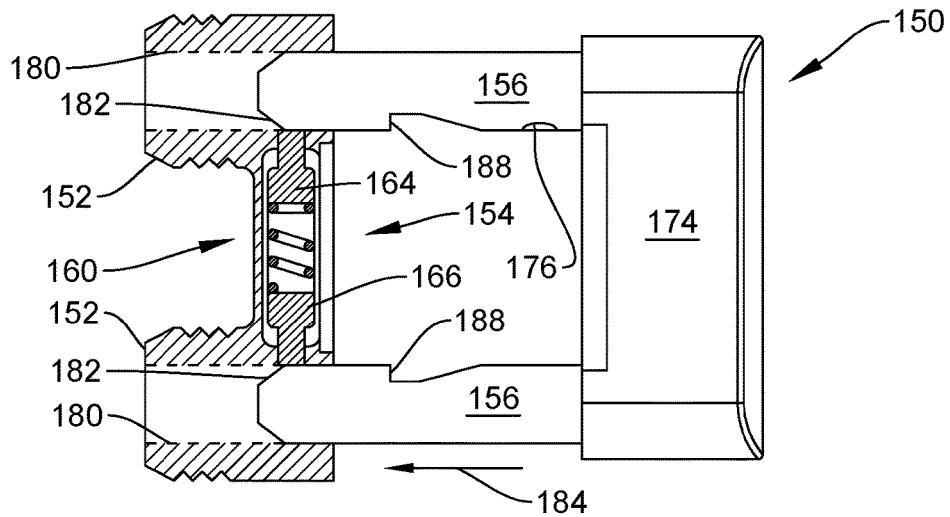
FIG. 18 is. a side detail view of FIG. 17, showing an initial stage of assembly.
Figure 19:
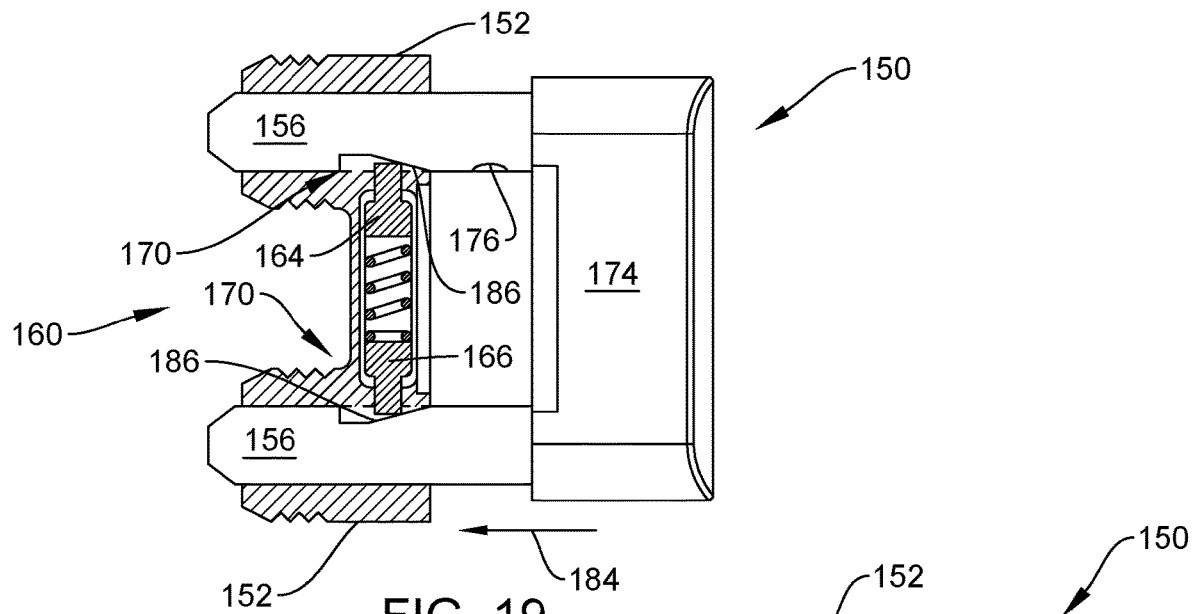
FIG. 19 is a side detail view of FIG. 18, showing a further stage of assembly.
Figure 20:
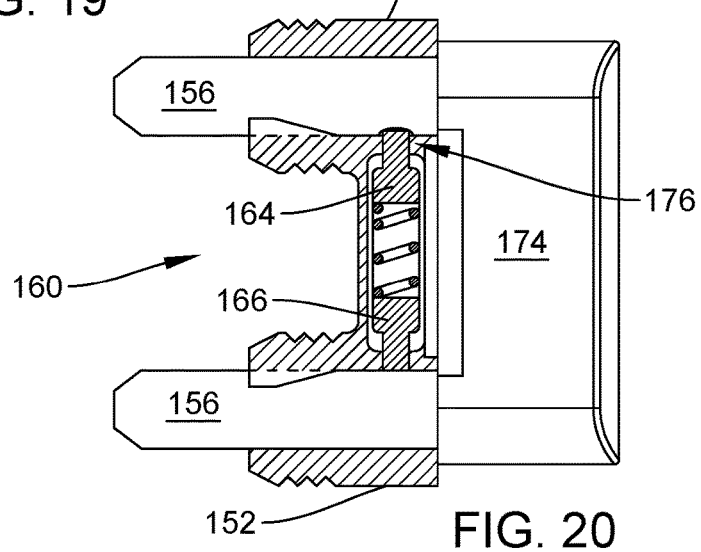
FIG. 20 is a side detail view of FIG. 19, showing a final stage of assembly.

FIGS. 18-20 show progressive insertion of denture connector 150 into the fully engaged position locking denture 102 to prong anchor 104 (FIG. 6). Initially, and as seen in FIG. 18, denture connector 150 is inserted partially into barrels 152. Barrels 152 are shown isolated from denture 102 for clarity of the view in FIG. 18, although again, barrels 152 are friction fit or cemented to denture 102. As prongs 156 enter passages 180 of barrels 152, tapered shoulders 182 of prongs 156 compress sections 164 and 166 of expansible pin 160 together. Ends of sections 164 and 166 will slide along prongs 156 as the latter continue to move in a direction of insertion (seen as arrow 184).

A further feature of the embodiment of FIGS. 14-20 is that bridge 154 secures barrels 152 parallel to one another. This facilitates insertion of denture connector 150 into barrels 152, and also facilitates removal.

FIG. 19 shows a further stage of insertion of prongs 156 into barrels 152. It will be seen that ends of sections 164 and 166 of expansible pin 160 are sliding along a ramp 186 of depressions 170. The role of depressions 170 will be explained hereinafter. Again, the right connector 120 of FIG. 7 depicts full insertion of denture connector 120, with full insertion of denture connector 150 appearing substantially similar to the position of connector 150 shown in FIG. 20. However, with denture connector 150, a further feature comes into play.

Referring now to FIG. 20, with denture connector 150 fully inserted into barrels 152, section 164 of expansible pin 16 has been received in recess 176. This arrangement opposes casual disengagement of denture connector 150 from the fully inserted position seen in FIGS. 6 and 20. Resistance to engagement with recess 176 is easily overcome by finger pressure to enable denture connector 150 to be withdrawn from engagement with prong anchors 104 (FIG. 6) for removal of denture 102 (FIG. 7).

Chamber 158 of bridge 154 may be open on one side to enable insertion of expansible pin 160 into chamber 158. The denture retention system may include a removable closure 178 configured to close the open side of chamber 158.

It should be understood that denture connector 150 and barrels 152 perform similarly to their counterparts of FIGS. 1-13, and have similar structure to accomplish such performance, even if specific features have not been specified herein.

Implant 100, prong anchor 104, seat 110, denture connectors 120 and 150, and reinforcement bar 142 may be fabricated from a biocompatible metal such as titanium or titanium alloy. It is contemplated that prong anchor 104, denture connectors 120 and 150, and reinforcement bar 142 will be fabricated with dimensions and configuration unique to each patient. Denture 102 may utilize conventional dental resins cast around reinforcement bar 142.

While the novel denture retention system has been described in terms of two prongs 118 on each denture connector 120 or 150 and two implants 100, the number of prongs 118 and implants 100 used may be greater than two.

Drawings are drawn to internal scale, and also to external scale. By internal scale it is meant that the parts, components, and proportions thereof in the illustrated inventive example are drawn to scale relative to one another. As employed herein, external scale refers to scale of the illustrated example relative to scale of environmental elements or objects, regardless of whether the latter are included in the drawings. Where the inventive example claims external scale, the inventive and environmental elements may of course not be drawn to real or true life scale; rather, external scale signifies only that both the invention and environmental elements are drawn in scale to each other.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A denture retention system for frictionally retaining a denture to a jaw of a patient, the denture retention system comprising:
   at least one prong anchor having a plurality of prong reception sites and an implant connector configured to secure the prong anchor to a dental implant, wherein the prong anchor includes two said prong reception sites, with one said prong reception site on each side of the implant connector;
   a denture comprising a base, at least one prosthetic tooth mounted to the base, at least one opening in the base, the opening dimensioned and configured to receive an exposed portion of the prong anchor therein, and a plurality of prong passages in the base, each of the prong passages dimensioned and configured to slidably receive a prong therethrough; and
   a denture connector having a plurality of parallel prongs dimensioned and configured to pass through the prong passages of the denture and to be received within the prong reception sites of the prong anchor, wherein the prong reception sites of the prong anchor and the prong passages of the base of the denture are oriented to enable the parallel prongs of the denture connector to pass through the denture and be received laterally within the at least one prong anchor when the prong anchor is coupled to the dental implant and the dental implant is vertically oriented.

2. The denture retention system of claim 1, wherein the prong anchor comprises a bore in the prong anchor and a shoulder in the bore, the shoulder dimensioned and configured to entrap a head of a threaded fastener when a shaft of the threaded fastener is passed through the bore, and
   the threaded fastener having a threaded shaft matingly compatible with female threads of the dental implant and a head greater in a transverse dimension than the threaded shaft.

3. The denture retention system of claim 1, wherein the denture is a partial arch denture spanning at least two dental implants.

4. The denture retention system of claim 1, wherein the denture is a full arch denture spanning at least two dental implants.

5. The denture retention system of claim 1, wherein each said prong passage of the denture includes a radially elastic barrel member releasably engaging a respective said prong of the denture connector when the denture connector is installed through the denture.

6. The denture retention system of claim 5, further comprising a connector retention mechanism for retaining the denture connector to the denture when the denture is released from engagement from said patient's jaw.

7. The denture retention system of claim 6, wherein the connector retention mechanism includes
   each one of the prongs having a circumferential groove for receiving an internal surface of an expansible washer to retain the prong to the respective barrel; and
   each one of the barrels has an internal groove for receiving an outer surface of the expansible washer.

8. The denture retention system of claim 7, wherein the circumferential groove of the prong has one tapered end wall to facilitate expansion of the expansible washer when the denture connector is-passed through the denture and into the prong anchor, and an opposed square cut end wall to oppose travel of the prong past the denture when the denture connector is passed through the denture and out from the prong anchor.

9. The denture retention system of claim 1, further comprising a reinforcement bar in the base of the denture, to distribute and spread loads imposed by chewing when the denture is installed in the patient.

10. The denture retention system of claim 1, wherein the denture further comprises a recess configured to provide access for a tool to dislodge the denture connector from an installed position in the denture retention system.

11. The denture retention system of claim 5, wherein each said radially elastic barrel member comprises a barrel slotted to accommodate radial expansion, and a bridge connecting one of the barrels to another one of the barrels, and further wherein the bridge maintains the barrels parallel.

12. The denture retention system of claim 11, further comprising a connector retention mechanism for retaining the denture connector to the denture when the denture is released from engagement for said patient's jaw.

13. The denture retention system of claim 10, wherein the connector retention mechanism comprises a chamber formed in the bridge and an expansible pin dimensioned and configured to be received in the chamber, wherein the chamber has opposed openings enabling the expansible pin to protrude beyond the bridge.

14. The denture retention system of claim 13, wherein the expansible pin comprises two telescoping sections and a spring configured to bias the two telescoping sections to expand.

15. The denture retention system of claim 13, wherein the connector retention mechanism further comprises a depression on at least one of the prongs and wherein when the prongs are inserted into the barrels, the depression facing the expansible pin, and wherein the depressions include a shoulder to abut against the telescoping heads to prevent removal of the denture connector from the barrels when the denture is removed from the patient's jaw.

16. The denture retention system of claim 14, further comprising a recess in at least one of the prongs, the recess facing the expansible pin when the denture connector is fully inserted into the barrels of the bridge and into the prong anchor.

17. The denture retention system of claim 13, wherein the chamber of the bridge is open on one side to enable insertion of the expansible pin into the chamber, and wherein the denture retention system includes a removable closure configured to close the open side.

\* \* \* \* \*